United States Patent
Butler et al.

(10) Patent No.: US 11,769,351 B2
(45) Date of Patent: *Sep. 26, 2023

(54) ESTIMATING A RATE-BASED FARE UTILIZING LOCATION DATA AND TRANSACTION DATA

(71) Applicant: Capital One Services, LLC, McLean, VA (US)

(72) Inventors: Taurean Butler, Brooklyn, NY (US);
Brendan Way, Brooklyn, NY (US);
Abdelkadar M'Hamed Benkreira, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 250 days.

This patent is subject to a terminal disclaimer.

(21) Appl. No.: 17/301,182

(22) Filed: Mar. 29, 2021

(65) Prior Publication Data
US 2021/0217251 A1 Jul. 15, 2021

Related U.S. Application Data

(63) Continuation of application No. 16/551,277, filed on Aug. 26, 2019, now Pat. No. 10,964,126.

(51) Int. Cl.
*G07B 13/02* (2006.01)
*G07B 15/02* (2011.01)
(Continued)

(52) U.S. Cl.
CPC ............ *G07B 15/02* (2013.01); *G06N 20/00* (2019.01); *G06Q 20/4016* (2013.01);
(Continued)

(58) Field of Classification Search
CPC ....... G07B 15/02; H04W 4/029; G06N 20/00; G06Q 20/4016; G06Q 20/42; G06Q 30/0284
(Continued)

(56) References Cited

U.S. PATENT DOCUMENTS 10,964,126 B2    3/2021  Butler et al.
2013/0117155 A1*  5/2013  Glasgo ............... G06Q 20/4015
                                                             705/26.35
(Continued)

FOREIGN PATENT DOCUMENTS

WO      2009007752 A1    1/2009
WO   WO-2009007752 A1 *  1/2009   ............. G06Q 30/04

OTHER PUBLICATIONS

David Kravets, "GPS tracking of NYC cabbies flourishes even as they fight back", May 8, 2014; 5 pgs. (Year: 2014).*
(Continued)

*Primary Examiner* — Shannon S Campbell
*Assistant Examiner* — Freda A Nelson
(74) *Attorney, Agent, or Firm* — Harrity & Harrity, LLP

(57) ABSTRACT

A device may receive transaction data relating to a transaction event associated with a user and a merchant. The transaction data may include a merchant identifier and a transaction amount. The device may process the merchant identifier to determine whether the transaction event is associated with a rate-based service. The device may obtain, based on determining that the transaction event is associated with the rate-based service, location data from a user device associated with the user. The device may determine, based on the location data, a distance or a duration associated with the rate-based service. The device may determine, based on the distance or the duration, a transaction estimate for the rate-based service. The device may determine whether the transaction amount corresponds to the transaction estimate and perform one or more actions based on determining whether the transaction amount corresponds to the transaction estimate.

20 Claims, 9 Drawing Sheets

(51) Int. Cl.
*G06Q 20/42* (2012.01)
*H04W 4/029* (2018.01)
*G06Q 30/0283* (2023.01)
*G06N 20/00* (2019.01)
*G06Q 20/40* (2012.01)

(52) U.S. Cl.
CPC ......... *G06Q 20/42* (2013.01); *G06Q 30/0284* (2013.01); *H04W 4/029* (2018.02)

(58) Field of Classification Search
USPC .......................................................... 705/13
See application file for complete search history.

(56) References Cited

U.S. PATENT DOCUMENTS

| | | | | |
|---|---|---|---|---|
| 2014/0180730 | A1* | 6/2014 | Cordova | H04W 4/40 705/4 |
| 2015/0310434 | A1* | 10/2015 | Cheung | G06Q 20/3224 705/44 |
| 2015/0365575 | A1* | 12/2015 | Jonsson | H04N 21/42201 348/143 |
| 2016/0117781 | A1* | 4/2016 | Lee | G06Q 40/12 705/30 |
| 2016/0292679 | A1* | 10/2016 | Kolin | G06Q 50/30 |
| 2016/0327397 | A1 | 11/2016 | Cordova et al. | |
| 2016/0379141 | A1 | 12/2016 | Judge et al. | |
| 2017/0103588 | A1 | 4/2017 | Rajani et al. | |

OTHER PUBLICATIONS

David Kravets, "GPS Tracking of NYC Cabbies Flourishes Even as They Fight Back," ars Technica, 5 pages, May 8, 2014.

\* cited by examiner

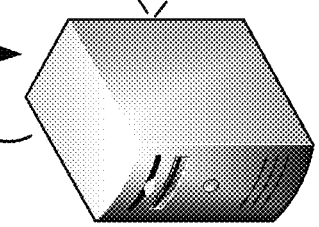
125
Determine a transaction estimate for the rate-based service
Fare Estimating Platform
FIG. 1C

400

410 — Receive transaction data relating to a transaction event associated with a user, wherein the transaction data includes a merchant identifier of a merchant and a transaction amount

420 — Process the merchant identifier of the transaction data to determine whether the transaction event is associated with a rate-based service

430 — Obtain, based on determining that the transaction event is associated with the rate-based service, location data from a user device associated with the user, wherein the location data identifies a movement of the user device over a time period prior to the transaction event

440 — Determine, based on the location data, at least one of a distance based on a starting location and an ending location associated with the rate-based service, or a duration based on a starting time and an ending time associated with the rate-based service

450 — Determine, based on the at least one of distance or duration, a transaction estimate for the rate-based service

460 — Determine whether the transaction amount corresponds to the transaction estimate

470 — Perform one or more actions based on determining whether the transaction amount corresponds to the transaction estimate

FIG. 4

ESTIMATING A RATE-BASED FARE UTILIZING LOCATION DATA AND TRANSACTION DATA

RELATED APPLICATION

This application is a continuation of U.S. patent application Ser. No. 16/551,277, filed Aug. 26, 2019 (now U.S. Pat. No. 10,964,126), which is incorporated herein by reference in its entirety.

BACKGROUND

An individual may provide people, or computing devices, with information regarding a location of the individual for a variety of reasons. A computing device of a user may often include one or more components capable of identifying a location of the computing device (e.g., global positioning system (GPS) component, Wi-Fi component, and/or the like) to determine a geographic location of the computing device, which may be provided to other users and/or devices.

SUMMARY

According to some implementations, a method may include receiving, by a device and from a transaction device, transaction data relating to a transaction event associated with a user, wherein the transaction device is associated with a merchant, and wherein the transaction data includes a merchant identifier of the merchant and a transaction amount. The method may include processing, by the device, the merchant identifier of the transaction data to determine whether the transaction event is associated with a rate-based service. The method may include obtaining, by the device and based on determining that the transaction event is associated with the rate-based service, location data from a user device associated with the user, wherein the location data identifies a movement of the user device over a time period prior to the transaction event. The method may include determining, by the device and based on the location data, at least one of: a distance, based on a starting location and an ending location associated with the rate-based service, or a duration, based on a starting time and an ending time associated with the rate-based service. The method may include determining, by the device and based on the at least one of distance or duration, a transaction estimate for the rate-based service. The method may include determining, by the device, whether the transaction amount corresponds to the transaction estimate. The method may include performing, by the device, one or more actions based on determining whether the transaction amount corresponds to the transaction estimate.

According to some implementations, a device may include one or more memories, and one or more processors, communicatively coupled to the one or more memories, configured to receive, from a transaction device, transaction data relating to a transaction event associated with a user, wherein the transaction device is associated with a merchant, and wherein the transaction data includes a merchant identifier of the merchant and a transaction amount. The one or more processors may be configured to process the merchant identifier of the transaction data to determine whether the transaction event is associated with a rate-based service. The one or more processors may be configured to obtain, based on determining that the transaction event is associated with the rate-based service, location data from a user device associated with the user, wherein the location data identifies a movement of the user device over a time period prior to the transaction event. The one or more processors may be configured to determine, using a model and based on the location data, a starting location associated with the rate-based service or a starting time associated with the rate-based service. The one or more processors may be configured to determine, based on the location data and a time associated with the transaction event, an ending location associated with the rate-based service or an ending time associated with the rate-based service. The one or more processors may be configured to determine, based on the starting location and the ending location or based on the starting time and the ending time, a transaction estimate for the rate-based service. The one or more processors may be configured to determine whether the transaction amount corresponds to the transaction estimate. The one or more processors may be configured to perform one or more actions based on determining whether the transaction amount corresponds to the transaction estimate.

According to some implementations, a non-transitory computer-readable medium may store one or more instructions that, when executed by one or more processors, cause the one or more processors to receive, from a transaction device, transaction data relating to a transaction event associated with a user, wherein the transaction device is associated with a merchant, and wherein the transaction data includes a merchant identifier of the merchant and a transaction amount. The one or more instructions may cause the one or more processors to process the merchant identifier of the transaction data to determine whether the transaction event is associated with a rate-based service. The one or more instructions may cause the one or more processors to obtain, based on determining that the transaction event is associated with the rate-based service, location data from a user device associated with the user, wherein the location data identifies a movement of the user device over a time period prior to the transaction event. The one or more instructions may cause the one or more processors to determine, based on the location data, a transaction estimate for the rate-based service. The one or more instructions may cause the one or more processors to determine whether the transaction amount corresponds to the transaction estimate. The one or more instructions may cause the one or more processors to perform one or more actions based on determining whether the transaction amount corresponds to the transaction estimate.

BRIEF DESCRIPTION OF THE DRAWINGS

FIGS. 1A-1D are diagrams of one or more example implementations described herein.

FIGS. 4-6 are flow charts of example processes for estimating a rate-based fare.

DETAILED DESCRIPTION

Figure 1A:
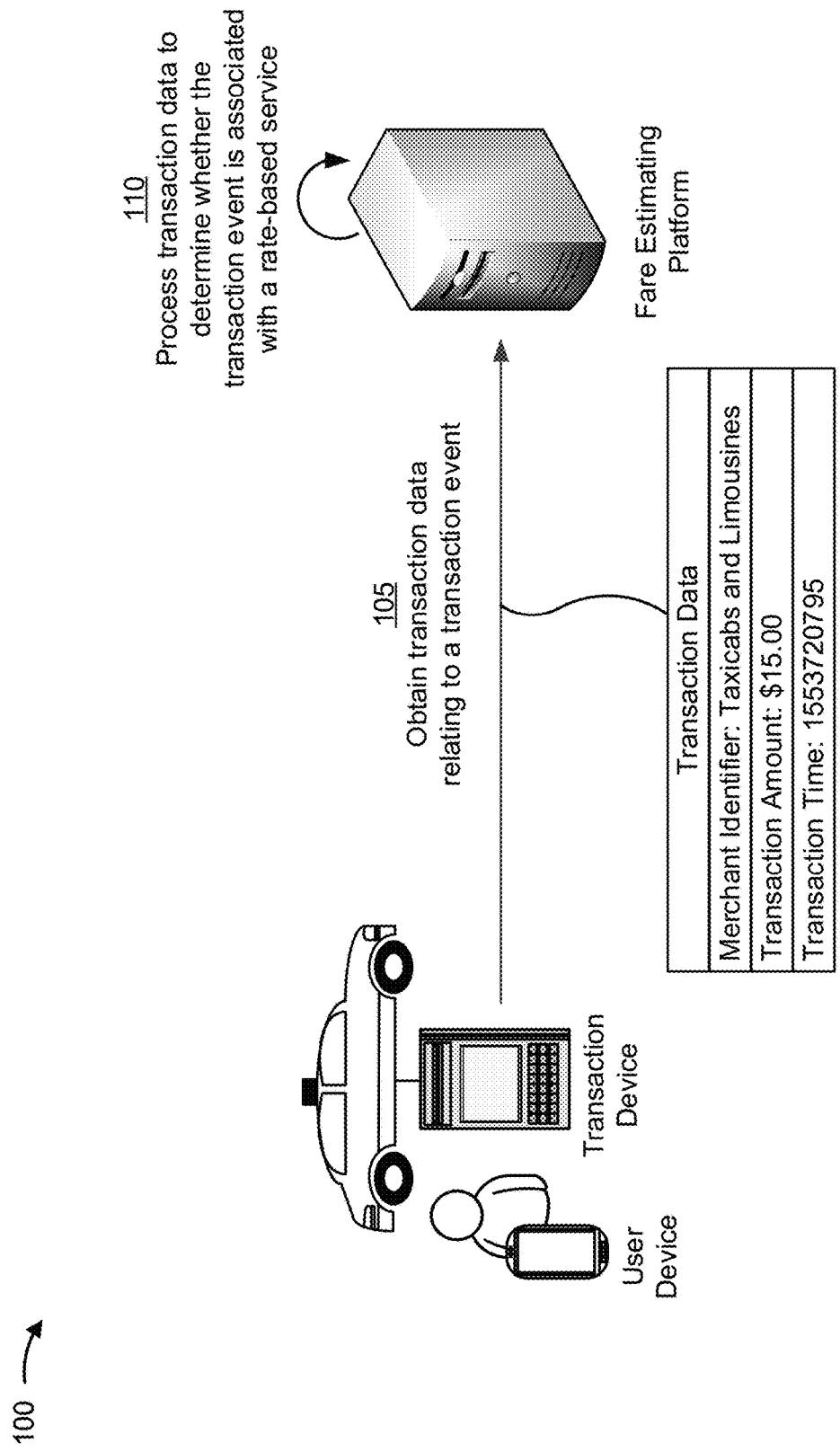

The following detailed description of example implementations refers to the accompanying drawings. The same reference numbers in different drawings may identify the same or similar elements.

Rate-based services (e.g., taxi services) employ a formula for calculating a fare that may be based on a distance and/or a duration associated with a usage of the service. The formula may be complex, and therefore difficult for a user of the rate-based service to understand. In addition, a provider of the rate-based service may inflate the distance and/or the duration associated with the usage of the service (e.g., by taking a longer-than-necessary route). As a result, a provider of the rate-based service may overcharge the user for the rate-based service (e.g., fraudulently or accidentally).

Currently, techniques exist to provide a user with an estimate of a fare for a rate-based service (e.g., a taxi service). For example, current techniques may determine an estimate of a fare based on rate data and a fare formula for the rate-based service. This may require collection of rate data and fare formulas for numerous service providers, numerous times of day, numerous locations, and/or the like. Moreover, rate data and fare formulas that are collected need frequent updating as service providers may change rates, fare formulas, and/or the like. Furthermore, current techniques may rely on location data from a user's device (e.g., a smartphone) in order to determine a distance or a duration associated with the user's use of the rate-based service. This may require continuous monitoring of location data from the user's device, which exposes all of the user's private location data, some of which may be unrelated to the rate-based service. Moreover, continuous monitoring of the location data consumes considerable resources (e.g., processor resources, memory resources, network resources, and/or the like).

Some implementations described herein include a fare estimating platform that facilitates an improved fare estimate for a rate-based service. The fare estimating platform may obtain historical (e.g., cached) location data from a user device of a user after determining that the user is associated with a transaction event relating to a rate-based service. Based on the historical location data, the fare estimating platform may determine a duration and/or a distance associated with the user's use of the rate-based service according to a movement of the user device that is identified in the location data. Furthermore, the fare estimating platform may determine a transaction estimate for the user's use of the rate-based service based on historical transactions involving a historical duration and/or a historical distance corresponding to the duration and/or the distance associated with the user's use of the rate-based service.

In this way, the fare estimating platform determines a transaction estimate for a rate-based service by obtaining and processing location data as needed, rather than continuously. Accordingly, the fare estimating platform better protects the privacy of the user's location data and conserves resources (e.g., processor resources, memory resources, network resources, and/or the like) that would otherwise be used if the location data were continuously obtained and processed. Furthermore, by basing transaction estimates on historical transactions, the fare estimating platform can reduce or eliminate a need to collect and maintain rate data and fare formulas for numerous service providers, numerous times of day, numerous locations, and/or the like. Reducing or eliminating the collection and maintenance of such data further conserves resources.

In addition, the fare estimating platform facilitates prompt notification of a discrepancy between a transaction estimate for a rate-based service and an actual transaction amount charged for the rate-based service. In this way, the fare estimating platform can prevent, or quickly remediate, overcharges (e.g., fraudulent overcharges) for rate-based services, thereby conserving resources involved in identifying, investigating, and/or correcting overcharges that otherwise may have occurred.

FIGS. 1A-1D are diagrams of one or more example implementations 100 described herein. As shown in FIGS. 1A-1D, example implementation(s) 100 may include a transaction device, a user device, and a fare estimating platform.

The transaction device (e.g., a point-of-sale terminal) may be an electronic telecommunications device that enables a user to perform a transaction. The transaction device may communicate transaction data relating to a transaction event to the fare estimating platform or to a payment gateway system that is accessible to the fare estimating platform. The transaction device may be associated with a merchant that provides a rate-based service. For example, the transaction device may be associated with a merchant that provides a taxi service. In such a case, the transaction device may be installed in, or otherwise present in, a vehicle (e.g., a taxi) associated with the taxi service. While the description to follow will be described in terms of an example of a taxi service, the description is not limited to this particular example. Implementations described herein also apply to other rate-based services, such as ride-sharing services, pedicab services, bicycle-sharing services, scooter-sharing services, moving services, hauling services, courier services, and/or the like.

The user device (e.g., a smart phone, an internet of things (IoT) device, a wearable communications device, and/or the like) may be associated with a user of the rate-based service. For example, the user device may be associated with a user who intends to use a taxi service, is currently using the taxi service, or recently used the taxi service. The user device may collect location data relating to a movement of the user device and may store the location data for a particular time period (e.g., 24 hours, 1 week, 1 month, and/or the like) to permit subsequent retrieval of the location data by the fare estimating platform.

The fare estimating platform may be a computing device, a server, a cloud computing device, and/or the like that monitors and/or authorizes one or more transactions of the transaction device. In some implementations, the fare estimating platform may receive transaction data from the transaction device as part of a transaction authorization request. The fare estimating platform may be associated with a financial institution (e.g., a bank, a credit provider, a payment processor, and/or the like). For example, the fare estimating platform may be associated with a financial institution that provides payment gateway services to a merchant that provides a rate-based service.

Some example implementations described herein concern a single transaction device, fare estimating platform, user device, and/or user, but implementations may include a plurality of transaction devices, fare estimating platforms, user devices, and/or users. In some implementations, the transaction device, the fare estimating platform, and/or the user device may be connected via a network, such as the internet, an intranet, and/or the like.

As shown in FIG. 1A, and by reference number 105, the fare estimating platform may obtain transaction data relating to a transaction event. For example, upon completion of a taxi ride, the user may swipe a transaction card at the transaction device (e.g., a point-of-sale terminal) of the merchant, which may transmit transaction data associated with the transaction event (e.g., a merchant identifier, a user account, a transaction amount, a transaction time, and/or the like) to a payment gateway system (e.g., a payment gateway system associated with the fare estimating platform). Thus, the fare estimating platform may detect a transaction event associated with a transaction card of the user by monitoring a transaction stream (e.g., an updating, chronological list of transactions processed by the payment gateway system) associated with the merchant, and obtain the transaction data from the transaction stream. Transaction events of the transaction stream may be associated with transaction times. Thus, the fare estimating platform may determine a transaction time of a transaction event based on the transaction stream.

The transaction event may be a transaction authorization request. For example, the transaction authorization request may be associated with a payment transaction for a rate-based service. The transaction data may include a merchant identifier of the merchant (e.g., a unique alphanumeric identifier of the merchant, a name of the merchant, a description of the merchant, a category identifier of the merchant, and/or the like), a transaction amount (e.g., a fare), a transaction time, and/or the like.

As shown by reference number 110, the fare estimating platform may process the transaction data to determine whether the transaction data is associated with a rate-based service (e.g., a taxi service). In some implementations, the fare estimating platform may determine whether the transaction event is associated with a rate-based service based on a category identifier of the merchant (e.g., a merchant category code) included in the transaction data.

In some implementations, the fare estimating platform may utilize a mapping of category identifiers to service types in order to determine whether the transaction event is associated with a rate-based service. For example, the mapping may associate a category identifier for taxi services with a rate-based service type. The mapping may be stored in a data structure (e.g., a data repository, a database, a table, a list, and/or the like) that is accessible to the fare estimating platform.

In some implementations, the fare estimating platform may utilize a model, such as a machine learning model, to determine whether the transaction event is associated with a rate-based service. For example, a machine learning model may output an indication of whether the transaction event is associated with a rate-based service based on the category identifier. Additionally, or alternatively, the fare estimating platform may utilize natural language processing to determine whether the transaction event is associated with a rate-based service. For example, the fare estimating platform may perform natural language processing on a name of the merchant and/or a description of the merchant included in the transaction data to determine whether the transaction event is associated with a rate-based service.

In some implementations, a category identifier of the merchant may identify the merchant as a provider of a rate-based service. For example, a category identifier may be a merchant category code that identifies the merchant as a provider of a rate-based service.

Figure 1B:
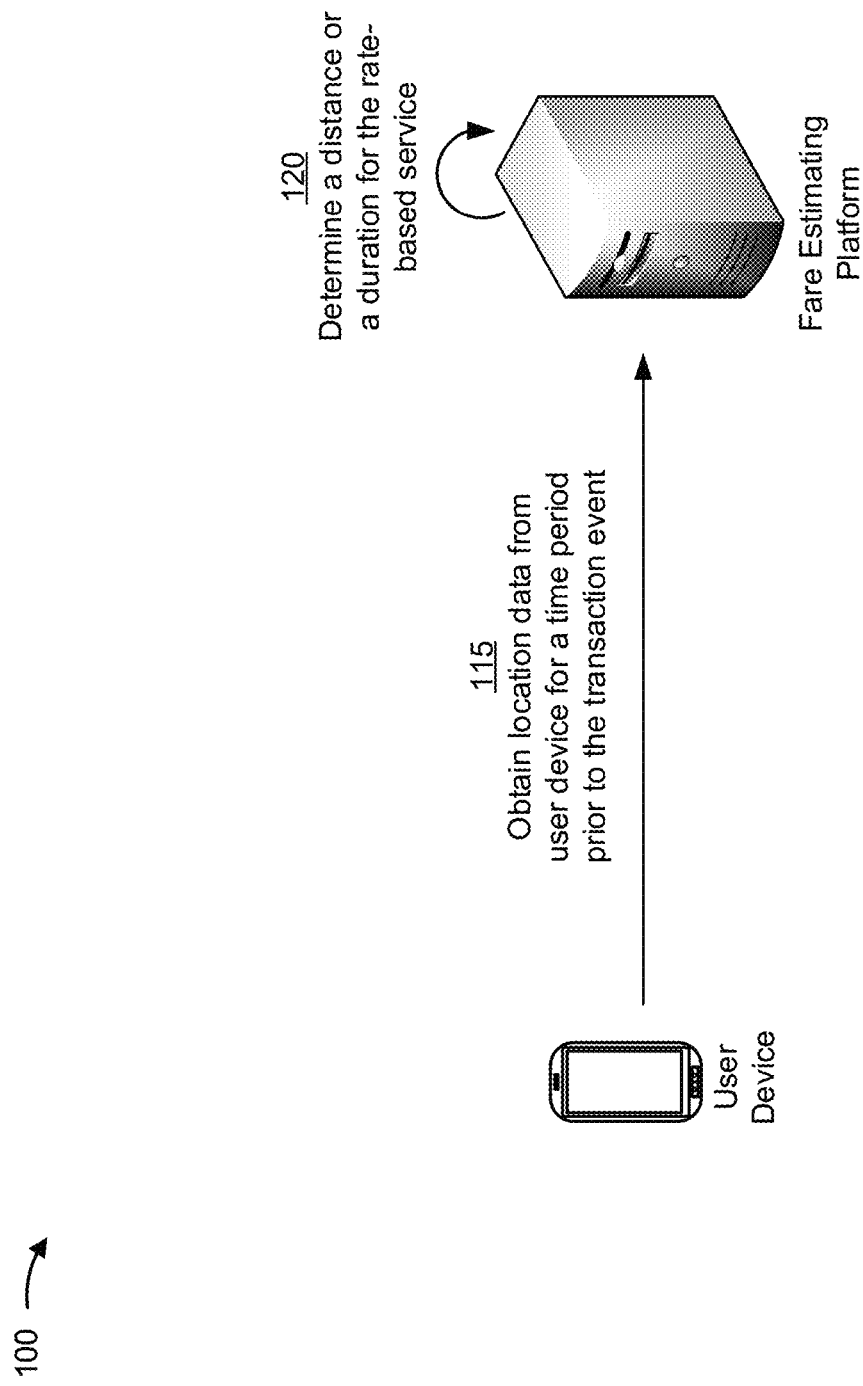

As shown in FIG. 1B, and by reference number 115, the fare estimating platform may obtain location data (e.g., GPS data) from the user device of the user for a time period prior to the transaction event. For example, based on determining that the transaction event is associated with a rate-based service, the fare estimating platform may obtain historical location data from the user device for a time period prior to the transaction event (e.g., 30 minutes prior to the transaction event, an hour prior to the transaction event, and/or the like). In such a case, the user device may store (e.g., cache) location data (e.g., store location data at 30 second intervals, 1 minute intervals, and/or the like) for a particular time period (e.g., 24 hours, 1 week, 1 month, and/or the like). The fare estimating platform may use the historical location data to determine a movement of the user device over the time period prior to the transaction event. In this way, the fare estimating platform may obtain and process location data as needed, rather than continuously, thereby better protecting privacy of the user's location data and conserving resources (e.g., processor resources, memory resources, network resources, and/or the like) that would otherwise be used if the location data were continuously obtained and processed.

In some implementations, the fare estimating platform also may obtain sensor data from the user device of the user. For example, based on determining that the transaction event is associated with a rate-based service, the fare estimating platform may obtain historical sensor data from the user device for a time period prior to the transaction event in a manner similar to that described above for the historical location data. The sensor data may include gyroscope data from a gyroscope of the user device, acceleration data from an accelerometer of the user device, audio data from a microphone of the user device, image data from a camera of the user device, and/or the like.

The location data and/or the sensor data may be associated with time data. Thus, the fare estimating platform may correlate a particular movement of the user device and/or a particular motion of the user device to a particular time based on the time data.

The time period prior to the transaction event may be a time period that is associated with the rate-based service. For example, the time period may be greater than, or equal to, an estimated duration (e.g., an estimated maximum duration) for the rate-based service (e.g., an estimated duration included in a mapping, or determined by a machine learning model, as described above). Thus, a particular rate-based service, a particular merchant that provides a rate-based service, and/or the like may be associated with a particular estimated duration that is used to determine the time period prior to the transaction event for which location data is to be obtained. For example, the fare estimating platform may determine that an estimated duration (e.g., an estimated maximum duration) for a taxi service is one hour, and accordingly obtain location data from the user device for a one-hour time period prior to the transaction event.

As shown by reference number 120, the fare estimating platform may determine a distance and/or a duration for the rate-based service. That is, the fare estimating platform may determine the distance and/or the duration associated with the user's use of the rate-based service. The fare estimating platform may determine the distance based on a starting location of the user device in connection with the rate-based service and an ending location of the user device in connection with the rate-based service. The fare estimating platform may determine the duration based on a starting time of the user's use of the rate-based service and an ending time of the user's user of the rate-based service. The starting time may be associated with the starting location and the ending time may be associated with the ending location (e.g., according to associations between locations and times provided in the location data). Thus, based on the location data, a determination of the starting location may provide a starting time, a determination of the ending time may provide an ending location, etc.

The fare estimating platform may determine the ending time associated with the user's use of the rate-based service based on a transaction time included in the transaction data. In some implementations, the fare estimating platform may determine the ending time associated with the user's use of the rate-based service based on a transaction time associated with the transaction event in the transaction stream. The fare estimating platform may determine an ending location associated with the user's use of the rate-based service based on the ending time. For example, based on associations between locations and times included in the location data, the fare estimating platform may determine the ending location based on the ending time.

The fare estimating platform may determine the starting location associated with the user's use of the rate-based service based on a movement of the user device identified in the location data. In some implementations, the fare estimating platform may determine the starting location based on a change in a movement of the user device from a walking speed to a driving speed. The walking speed may be based on a walking speed associated with the user (e.g., an average walking speed of the user determined from historical location data of the user device) or a plurality of users (e.g., an average walking speed of the plurality of users determined from historical location data from a plurality of user devices). Additionally, or alternatively, the walking speed may be based on experimental data or reference data relating to walking speed. The driving speed may be based on a speed limit associated with a location of the user device, a historical driving speed (e.g., an average driving speed) associated with the location, a historical traffic pattern associated with the location, a current traffic condition associated with the location, and/or the like.

In some implementations, the fare estimating platform may determine the starting location based on an initiation of a movement of the user device at a driving speed. For example, the fare estimating platform may determine a location at which the user device began to move in a manner corresponding to then-existing traffic conditions at the location. Continuing with the previous example, the fare estimating platform may determine that the starting location is the location.

In some implementations, the fare estimating platform may determine the starting location based on a change in a movement of the user device from a pedestrian area to a roadway area. The pedestrian area may be a building, a sidewalk, a public space, and/or the like. The roadway area may be a street, a highway, and/or the like. The fare estimating platform may identify pedestrian areas and roadway areas based on map data, satellite data, traffic data, and/or the like.

The fare estimating platform may determine a starting time associated with the user's use of the rate-based service based on the starting location. For example, based on associations between locations and times included in the location data, the fare estimating platform may determine the starting time based on the starting location.

In some implementations, the fare estimating platform may determine a starting time based on a motion of the user device identified in the sensor data. For example, the fare estimating platform may determine the starting time based on a motion of the user device that indicates a change from a standing position of the user to a sitting position of the user (e.g., the motion corresponds to a pattern associated with a change from a standing position to a sitting position). Additionally, or alternatively, the fare estimating platform may determine the starting time based on a motion of the user device that indicates a change from a walking motion (e.g., an up-and-down motion pattern associated with a walking gait) to a motion associated with being seated in a car (e.g., a relatively steady motion pattern). Additionally, or alternatively, the fare estimating platform may determine the starting location based on a motion of the user device that indicates the user was entering a vehicle (e.g., the motion corresponds to a pattern associated with entering a vehicle). The motion of the user device may be characterized by gyroscope data from a gyroscope of the user device, acceleration data from an accelerometer of the user device, and/or the like. Additionally, or alternatively, the fare estimating platform may determine the starting time based on audio data from a microphone of the user device (e.g., audio data that corresponds to an audio signature associated with a change from a standing position of the user to a sitting position of the user or an audio signature associated with entering a vehicle) or image data from a camera of the user device (e.g., image data that identifies a vehicle, such as a taxi, according to a computer vision technique). The fare estimating platform may determine the starting time based on time data associated with the sensor data (e.g., a time associated with the change in position or the entering of the vehicle).

The fare estimating platform may determine a starting location associated with the user's use of the rate-based service based on the starting time. For example, based on associations between locations and times included in the location data, the fare estimating platform may determine the starting location based on the starting time.

In some implementations, the fare estimating platform may determine a starting time and/or a starting location associated with the user's use of the rate-based service from an input provided by the user. For example, the user may initiate a timer, indicate a location on a map, input a starting location, and/or the like upon initiating a rate-based service. In some implementations, the fare estimating platform may determine a starting time and/or a starting location based on an abnormality in the location data. For example, the location data may indicate that the user device was in a first location (e.g., Chicago) at a data point of the location data and in a second location (e.g., Boston) at an adjacent data point. In such a case, the fare estimating platform may determine whether a distance between the first location and the second location satisfies a threshold value, and determine that a starting location and/or a starting time is a location and/or a time of the location data associated with an airport.

In some implementations, the fare estimating platform may employ an artificial intelligence technique, such as machine learning, deep learning, and/or the like. For example, the fare estimating platform may use a machine learning model to determine a starting location and/or a starting time of the user's use of the rate-based service. For example, the fare estimating platform may train the machine learning model based on one or more parameters associated with initiating a rate-based service, such as location data relating to walking speeds, driving speeds, pedestrian areas, roadway areas, and/or the like as well as sensor data relating to standing positions, sitting positions, walking motions, entering a vehicle, and/or the like. The fare estimating platform may train the machine learning model, according to the one or more parameters, using historical data associated with initiating a rate-based service. Using the historical data and the one or more parameters as inputs to the machine learning model, the fare estimating platform may determine an initiation of a rate-based service in order to determine a starting location and/or a starting time associated with the user's use of the rate-based service.

In some implementations, the fare estimating platform may transmit a notification to the user device requesting that the user provide a starting time, ending time, starting location, and/or ending location associated with the user's use of the rate-based service. For example, the notification may provide a map on which the user may indicate a starting location and/or an ending location associated with the user's use of the rate-based service. As another example, the notification may prompt the user to respond (e.g., via messaging) with a starting time, an ending time, and/or a duration associated with the user's use of the rate-based service.

The fare estimating platform may log information relating to the user's use of the rate-based service. For example, the fare estimating platform may log information relating to a starting time, an ending time, a starting location, an ending location, a transaction amount (e.g., a fare), a merchant providing the rate-based service, and/or the like associated with the user's use of the rate-based service. In this way, the fare estimating platform can collect historical data for use in determining a transaction estimate, as described below.

As shown in FIG. 1C, and by reference number 125, the fare estimating platform may determine a transaction estimate (e.g., a fare estimate) for the rate-based service. In some implementations, the fare estimating platform may determine the transaction estimate based on one or more historical transactions. For example, the fare estimating platform may identify one or more historical transactions that correspond to the user's use of the rate-based service. A historical transaction may be associated with a historical starting time, a historical ending time, a historical starting location, a historical ending location, a historical transaction amount, a historical merchant, and/or the like.

The fare estimating platform may determine that a historical transaction corresponds to the user's use of the rate-based service when a historical duration of the historical transaction (e.g., based on the historical starting time and the historical ending time) is the same as, or within a threshold amount of, the duration associated with the user. Additionally, or alternatively, the fare estimating platform may determine that a historical transaction corresponds to the user's use of the rate-based service when a historical distance of the historical transaction (e.g., based on the historical starting location and the historical ending location) is the same as, or within a threshold amount of, the distance associated with the user. In some implementations, the fare estimating platform may determine that a historical transaction corresponds to the user's use of the rate-based service (e.g., without a comparison of the distance or the duration associated with the user) when a historical starting location and/or a historical ending location of the historical transaction are the same as, or within a threshold distance of, the starting location and/or the ending location associated with the user.

The fare estimating platform may determine that a historical transaction corresponds to the user's use of the rate-based service additionally when the historical transaction and the transaction event relate to the same merchant. Additionally, the fare estimating platform may determine that a historical transaction corresponds to the user's use of the rate-based service when the historical transaction and the transaction event relate to the same geographical area (e.g., the same neighborhood, city, county, and/or the like). For example, the fare estimating platform may determine whether a historical starting location and/or a historical ending location of the historical transaction are within the same geographic area as the starting location and/or the ending location associated with the user. Additionally, the fare estimating platform may determine that a historical transaction corresponds to the user's use of the rate-based service when the historical transaction and the transaction event relate to the same time of day. For example, the fare estimating platform may determine whether a historical starting time and/or a historical ending time of the historical transaction are the same as, or within a threshold time of, the starting time and/or the ending time associated with the user.

As an example of when the fare estimating platform may determine that a historical transaction corresponds to the user's use of the rate-based service, if the starting location and the ending location associated with the user are in Chicago and the distance associated with the user is 2.1 miles, the fare estimating platform may determine that a historical transaction having a starting location and an ending location in Chicago and a historical distance of 2.1 miles corresponds to the user's use of the rate-based service. After determining one or more historical transactions that correspond to the user's use of the rate-based service, the fare estimating platform may determine a transaction estimate based on the one or more historical transactions. For example, the transaction estimate may be a historical transaction amount of a historical transaction (e.g., a historical transaction that most closely corresponds to the user's use of the rate-based service) of the one or more historical transactions found to correspond. As another example, the transaction estimate may be an average of historical transaction amounts for multiple historical transactions of the one or more historical transactions found to correspond. In this way, the fare estimating platform may determine the transaction estimate without expending resources needed to collect, store, and update rate data and/or fare formulas for numerous different merchants, geographic areas, times of day, and/or the like.

In some implementations, the fare estimating platform may use a machine learning model to determine a transaction estimate. For example, the fare estimating platform may train the machine learning model based on one or more parameters associated with a transaction, such as a starting time, an ending time, a starting location, an ending location, a transaction amount, a merchant associated with the transaction, and/or the like. The fare estimating platform may train the machine learning model, according to the one or more parameters, using data associated with the historical transactions. Using the data associated with the historical transactions and the one or more parameters as inputs to the machine learning model, the fare estimating platform may determine a fare estimate based on the user's use of the rate-based service.

In some implementations, the fare estimating platform may determine a transaction estimate using rate data and/or fare formulas associated with a particular merchant, a particular geographic area, and/or the like. For example, the rate data may be associated with a geographic area (e.g., a city) that encompasses the starting location and/or the ending location associated with the user. In some implementations, rate data and/or a fare formula may include a first rate and/or formula that are to be applied to a travel duration and a second rate and/or formula that are to be applied to a travel distance.

Figure 1D:
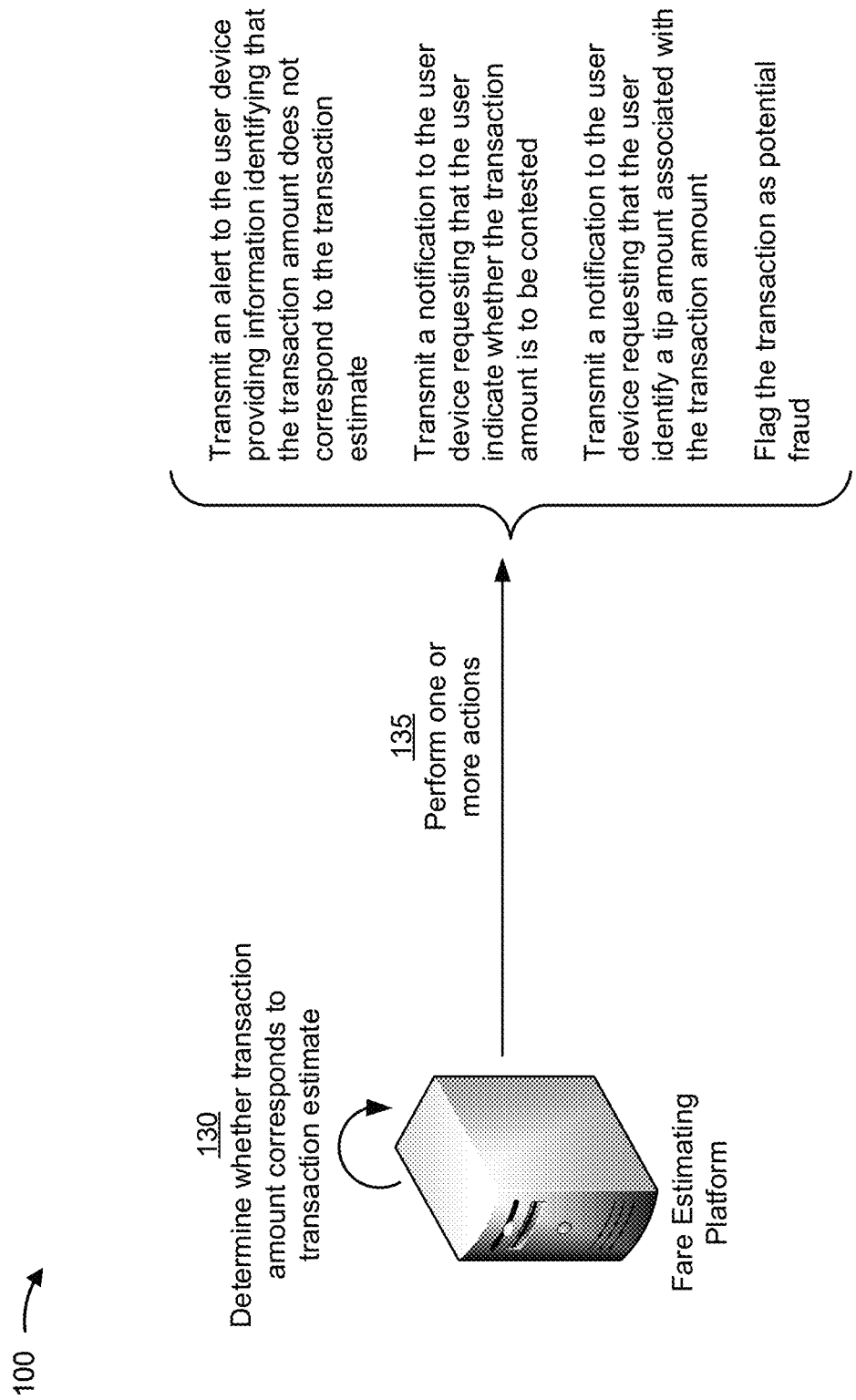

As shown in FIG. 1D, and by reference number 130, the fare estimating platform may determine whether the transaction amount corresponds to the transaction estimate. For example, the transaction amount may correspond to the transaction estimate when the transaction amount is within a threshold amount of the transaction estimate. In some implementations, the threshold amount may be a percentage of the transaction estimate (e.g., ±5%, ±10%, ±20%, and/or the like). Additionally, or alternatively, the threshold amount may be a monetary amount (e.g., $0.50, $1.00, $5.00, and/or the like). In some implementations, the fare estimating platform may utilize a machine learning model that has been trained to determine whether a difference between a transaction amount and a transaction estimate is anomalous, thereby indicating that the transaction amount does not correspond to the transaction estimate.

As shown by reference number 135, the fare estimating platform may perform one or more actions based on whether the transaction amount corresponds to the transaction estimate. In some implementations, the fare estimating platform may perform the one or more actions when the transaction amount corresponds to the transaction estimate. For example, the fare estimating platform may transmit a notification to the user device that provides information indicating that the transaction amount was reasonable for the user's use of the rate-based service. As another example, the fare estimating platform may automatically post a positive review of the rate-based service.

In some implementations, the fare estimating platform may perform the one or more actions when the transaction amount does not correspond to the transaction estimate. For example, the fare estimating platform may transmit a notification (e.g., an alert) to the user device that provides information indicating that the transaction amount was not reasonable for the user's use of the rate-based service. As another example, the fare estimating platform may transmit a notification to the user device that requests that the user indicate whether the transaction event is to be declined, whether the transaction event is to be flagged as fraud, whether the transaction amount is to be contested, and/or the like. As a further example, the fare estimating platform may transmit a notification to the user device that requests that the user identify a tip amount associated with the transaction event. The fare estimating platform may adjust the transaction estimate based on the tip amount to thereby determine whether the transaction amount corresponds to the transaction estimate as adjusted. As an additional example, the fare estimating platform may flag the transaction event as potential fraud and/or record information relating to the transaction event (e.g., the merchant, the transaction amount, a tip amount, and/or the like) and/or the user's use of the rate-based service (e.g., the duration, the distance, the location data, and/or the like) to permit a fraud investigation. The fare estimating platform may transmit one or more of the notifications described above as parts of a single notification or as separate notifications.

In this way, the fare estimating platform facilitates prompt identification of potentially-fraudulent activity, and facilitates prompt remedial action with regard to the potentially-fraudulent activity. Accordingly, the fare estimating platform may reduce or eliminate fraudulent activity (e.g., overcharging) relating to rate-based services, thereby conserving resources involved in identifying, investigating, and/or correcting fraudulent activity.

As indicated above, FIGS. 1A-1D are provided as one or more examples. Other examples may differ from what is described with regard to FIGS. 1A-1D.

Figure 2:
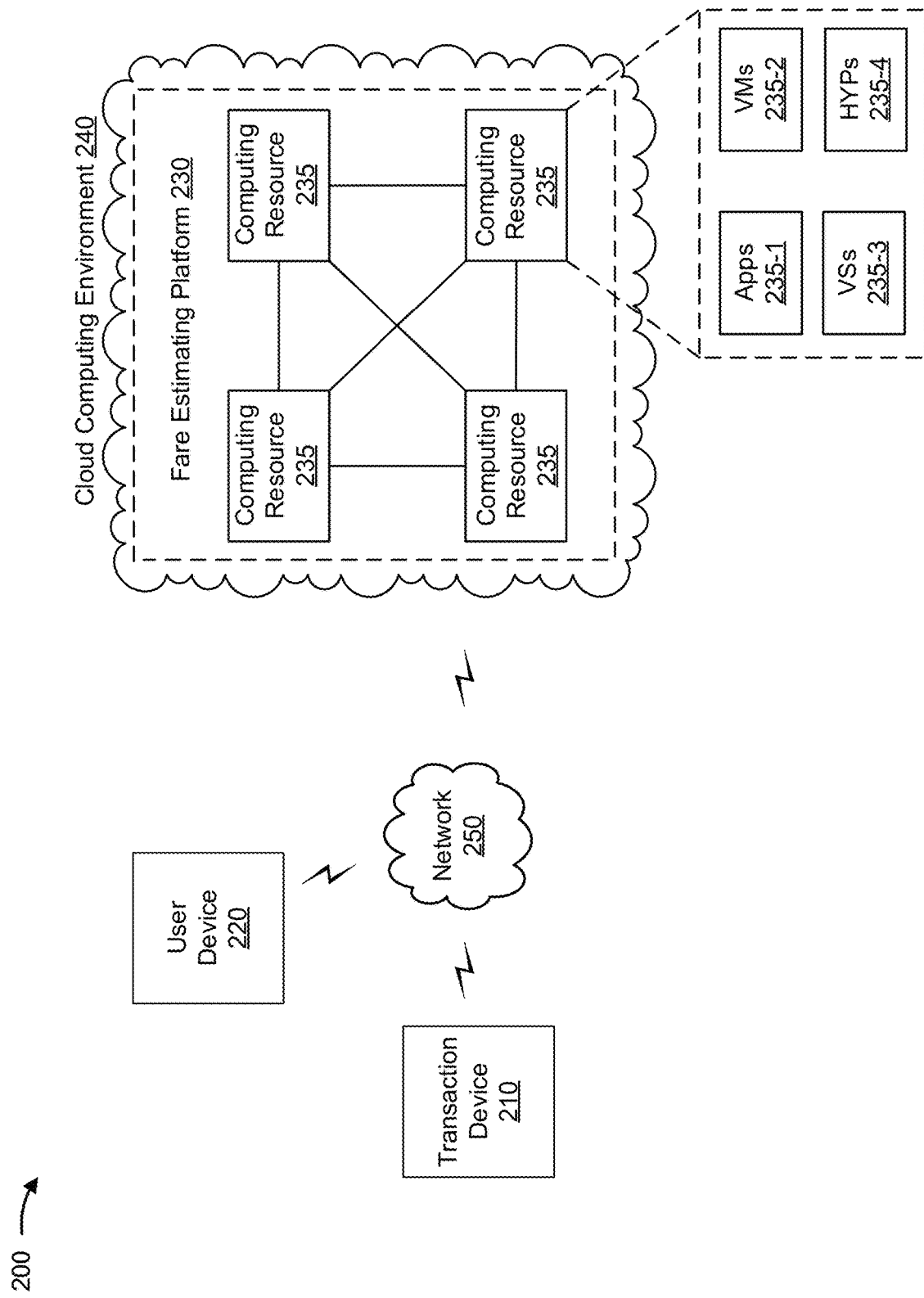
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a transaction device 210, a user device 220, a fare estimating platform 230, a computing resource 235, a cloud computing environment 240, and a network 250. Devices of environment 200 may interconnect via wired connections, wireless connections, or a combination of wired and wireless connections.

Transaction device 210 includes one or more devices capable of receiving, generating, storing, processing, and/or providing information relating to a transaction event. For example, transaction device 210 may include an automated teller machine (ATM) device, a point of sale (POS) device, a kiosk device, and/or the like. An ATM device may include an electronic telecommunications device that enables customers of financial institutions to perform financial transactions, such as cash withdrawals, deposits, transferring funds, obtaining account information, and/or the like, at any time and without direct interaction with employees of the financial institutions. A POS device may include an electronic device used to process transaction card payments at retail locations. The POS device may read information from a transaction card (e.g., a credit card, a debit card, a gift card, and/or the like), and may determine whether there are sufficient funds in an account associated with the transaction card for a transaction. The POS device may cause a transfer funds from the account associated with the transaction card to an account of a retailer and may record the transaction. A kiosk device may include a computer terminal featuring specialized hardware and software that provides access to information and/or applications for communication, commerce, entertainment, education, and/or the like.

User device 220 includes one or more devices capable of receiving, generating, storing, processing, and/or providing location data and/or sensor data. For example, user device 220 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, and/or the like), or a similar type of device.

Fare estimating platform 230 includes one or more devices capable of determining a transaction estimate for a rate-based service. For example, fare estimating platform 230 may include one or more servers and/or computers to store, generate, and/or provide information associated with a transaction estimate associated with a rate-based service. In some implementations, fare estimating platform 230 may transmit a notification to user device 220 and receive a response to the notification from user device 220, as described elsewhere herein.

In some implementations, fare estimating platform 230 may perform one or more functions of a transaction backend (e.g., a payment gateway system). For example, fare estimating platform 230 may include one or more devices capable of authorizing and/or facilitating a transaction. For example, fare estimating platform 230 may include one or more servers and/or computers to store and/or provide information (e.g., authorizations, balances, transaction tokens, security information, account information, and/or the like) associated with processing a transaction via transaction device 210.

Fare estimating platform 230 may include one or more devices associated with financial institutions (e.g., banks, credit unions, and/or the like) and/or transaction card associations that authorize the transaction and/or facilitate a transfer of funds or payments between an account of a cardholder of a transaction card and an account of an individual or business of transaction device 210. For example, fare estimating platform 230 may include one or more devices of one or more issuing financial institutions associated with a cardholder of a transaction card, one or more devices of one or more acquiring financial institutions (or merchant banks) associated with transaction device 210, and/or one or more devices associated with one or more card associations (e.g., VISA®, MASTERCARD®, and/or the like) associated with a transaction card. Accordingly, based on receiving transaction card data associated with a transaction card from transaction device 210, various financial institutions and/or card associations of fare estimating platform 230 may communicate to authorize the transaction and/or transfer funds between the accounts associated with the transaction card and/or transaction device 210.

Fare estimating platform 230 includes one or more computing resources assigned to determine a transaction estimate for a rate-based service. For example, fare estimating platform 230 may be a platform implemented by cloud computing environment 240 that may determine whether a transaction event is associated with a rate-based service, obtain location data and/or sensor data from user device 220, determine a transaction estimate for the rate-based service, transmit notifications to user device 220, and/or the like. In some implementations, fare estimating platform 230 is implemented by computing resources 235 of cloud computing environment 240.

Fare estimating platform 230 may include a server device or a group of server devices. In some implementations, fare estimating platform 230 may be hosted in cloud computing environment 240. Notably, while implementations described herein may describe fare estimating platform 230 as being hosted in cloud computing environment 240, in some implementations, fare estimating platform 230 may be non-cloud-based or may be partially cloud-based.

Cloud computing environment 240 includes an environment that delivers computing as a service, whereby shared resources, services, and/or the like may be provided to transaction device 210, user device 220, and/or the like. Cloud computing environment 240 may provide computation, software, data access, storage, and/or other services that do not require end-user knowledge of a physical location and configuration of a system and/or a device that delivers the services. As shown, cloud computing environment 240 may include fare estimating platform 230 and computing resource 235.

Computing resource 235 includes one or more personal computers, workstation computers, server devices, or another type of computation and/or communication device. In some implementations, computing resource 235 may host fare estimating platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by transaction device 210, user device 220, and/or the like. Application 235-1 may eliminate a need to install and execute the software applications on transaction device 210, user device 220, and/or the like. For example, application 235-1 may include software associated with fare estimating platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of a user, and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices)

of environment 200 may perform one or more functions described as being performed by another set of devices of environment 200.

Figure 3:
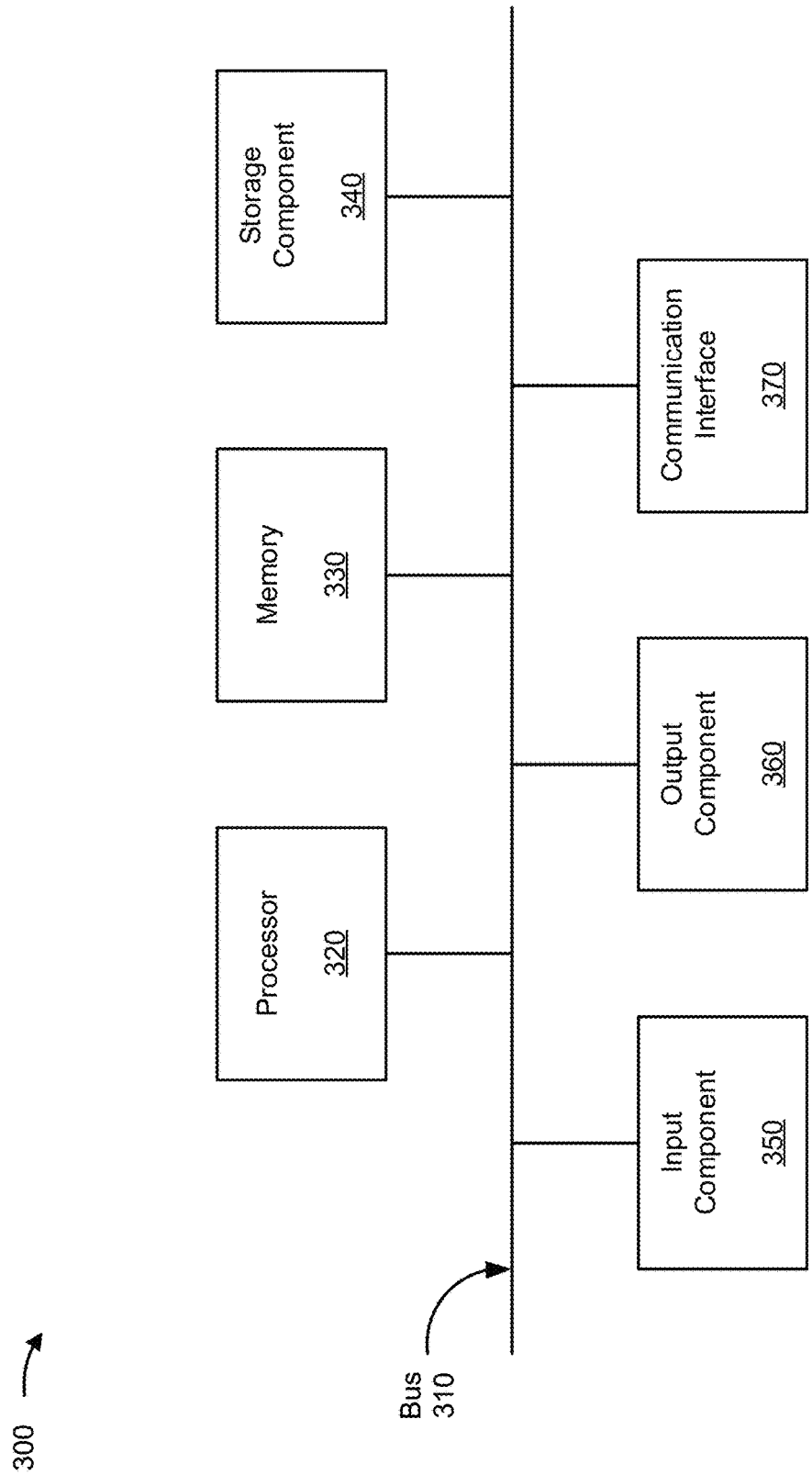
FIG. 3 is a diagram of example components of one or more devices of FIG. 2.

FIG. 3 is a diagram of example components of a device 300. Device 300 may correspond to transaction device 210, user device 220, fare estimating platform 230, and/or computing resource 235. In some implementations, transaction device 210, user device 220, fare estimating platform 230, and/or computing resource 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for estimating a rate-based fare. In some implementations, one or more process blocks of FIG. 4 may be performed by a fare estimating platform (e.g., fare estimating platform 230). In some implementations, one or more process blocks of FIG. 4 may be performed by another device or a group of devices separate from or including the fare estimating platform, such as a transaction device (e.g., transaction device 210), a user device (e.g., user device 220), and/or the like.

As shown in FIG. 4, process 400 may include receiving transaction data relating to a transaction event associated with a user, wherein the transaction data includes a merchant identifier of a merchant and a transaction amount (block 410). For example, the fare estimating platform (e.g., using computing resource 235, processor 320, memory 330, storage component 340, input component 350, communication interface 370, and/or the like) may receive transaction data relating to a transaction event associated with a user, as described above. In some implementations, the transaction data includes a merchant identifier of a merchant and a transaction amount.

As further shown in FIG. 4, process 400 may include processing the merchant identifier of the transaction data to determine whether the transaction event is associated with a rate-based service (block 420). For example, the fare estimating platform (e.g., using computing resource 235, processor 320, memory 330, storage component 340, and/or the like) may process the merchant identifier of the transaction data to determine whether the transaction event is associated with a rate-based service, as described above.

As further shown in FIG. 4, process 400 may include obtaining, based on determining that the transaction event is associated with the rate-based service, location data from a user device associated with the user, wherein the location data identifies a movement of the user device over a time period prior to the transaction event (block 430). For example, the fare estimating platform (e.g., using computing resource 235, processor 320, memory 330, storage component 340, input component 350, communication interface 370, and/or the like) may obtain, based on determining that the transaction event is associated with the rate-based service, location data from a user device associated with the user, as described above. In some implementations, the location data identifies a movement of the user device over a time period prior to the transaction event.

As further shown in FIG. 4, process 400 may include determining, based on the location data, at least one of a distance based on a starting location and an ending location associated with the rate-based service, or a duration based on a starting time and an ending time associated with the rate-based service (block 440). For example, the fare estimating platform (e.g., using computing resource 235, processor 320, memory 330, storage component 340, and/or the like) may determine, based on the location data, at least one of a distance based on a starting location and an ending location associated with the rate-based service, or a duration based on a starting time and an ending time associated with the rate-based service, as described above.

As further shown in FIG. 4, process 400 may include determining, based on the at least one of distance or duration, a transaction estimate for the rate-based service (block 450). For example, the fare estimating platform (e.g., using computing resource 235, processor 320, memory 330, storage component 340, and/or the like) may determine, based on the at least one of distance or duration, a transaction estimate for the rate-based service, as described above.

As further shown in FIG. 4, process 400 may include determining whether the transaction amount corresponds to the transaction estimate (block 460). For example, the fare estimating platform (e.g., using computing resource 235, processor 320, memory 330, storage component 340, and/or the like) may determine whether the transaction amount corresponds to the transaction estimate, as described above.

As further shown in FIG. 4, process 400 may include performing one or more actions based on determining whether the transaction amount corresponds to the transaction estimate (block 470). For example, the fare estimating platform (e.g., using computing resource 235, processor 320, memory 330, storage component 340, input component 350, output component 360, communication interface 370, and/or the like) may perform one or more actions based on determining whether the transaction amount corresponds to the transaction estimate, as described above.

Process 400 may include additional implementations, such as any single implementation or any combination of implementations described below and/or in connection with one or more other processes described elsewhere herein.

In a first implementation, the one or more actions include one or more of transmitting an alert to the user device providing information identifying that the transaction amount does not correspond to the transaction estimate, transmitting a first notification to the user device requesting that the user indicate whether the transaction amount is to be contested, transmitting a second notification to the user device requesting that the user identify a tip amount associated with the transaction amount, or flagging the transaction event as potential fraud.

In a second implementation, the fare estimating platform may determine the starting location or the starting time based on one or more of a location or a time associated with a change in the movement of the user device from a walking speed to a driving speed, a location or a time associated with a change in the movement of the user device from a pedestrian area to a roadway area, or a location or a time associated with a motion of the user device indicating a change from a standing position of the user to a sitting position of the user. In a third implementation, alone or in combination with one or more of the first and second implementations, the fare estimating platform, when determining the at least one of distance or duration, may determine the at least one of distance or duration using a machine learning model.

In a fourth implementation, alone or in combination with one or more of the first through third implementations, the transaction estimate for the rate-based service may be further based on a historical transaction amount for the merchant. The historical transaction amount may be associated with a historical distance that corresponds to the distance or a historical duration that corresponds to the duration. In a fifth implementation, alone or in combination with one or more of the first through fourth implementations, the transaction estimate for the rate-based service may be further based on data relating to rates for the rate-based service. In a sixth implementation, alone or in combination with one or more of the first through fifth implementations, the transaction amount may be based on a first rate associated with the rate-based service and a travel distance, or a second rate associated with the rate-based service and a travel time.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
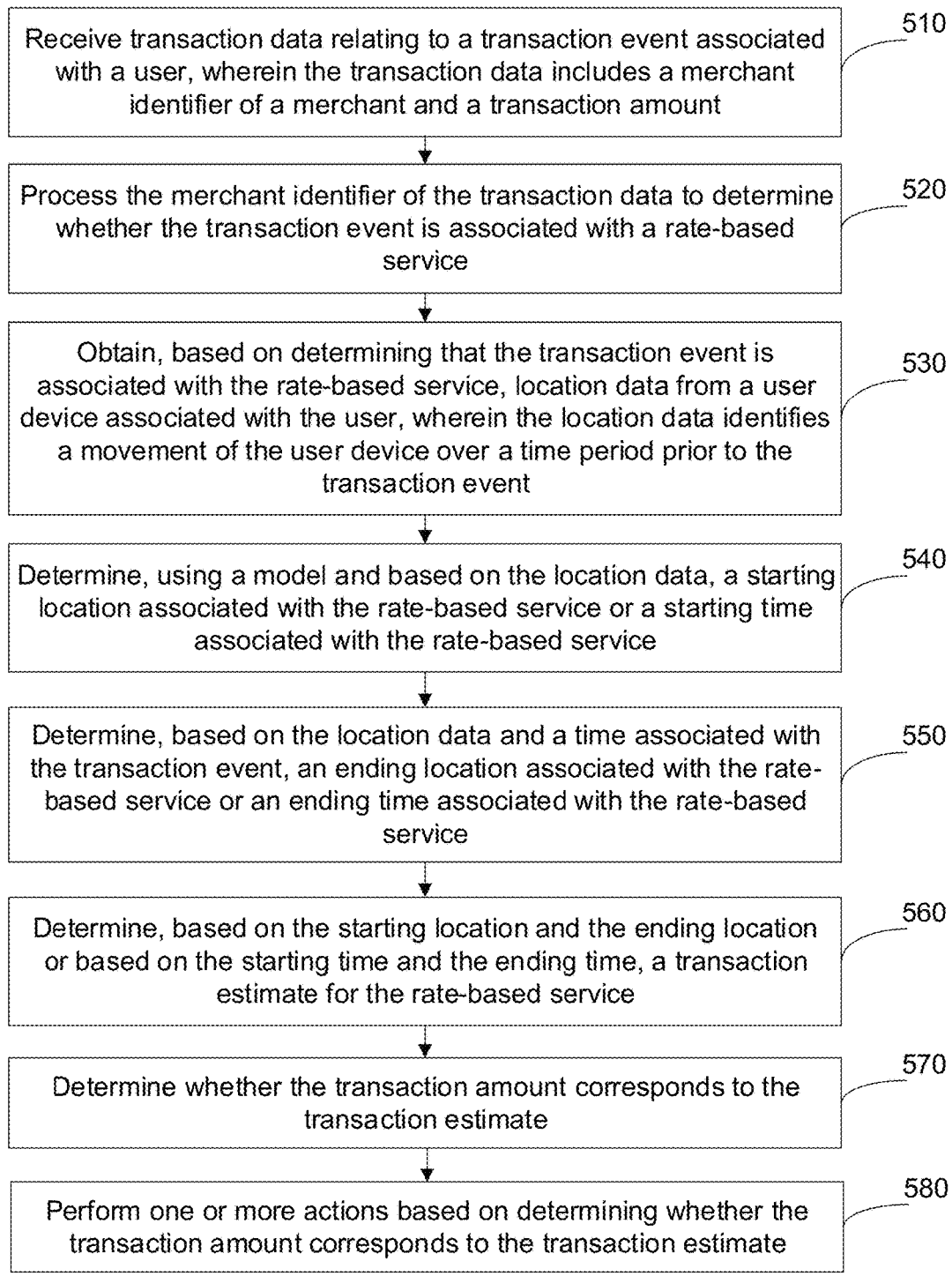

FIG. 5 is a flow chart of an example process 500 for estimating a rate-based fare. In some implementations, one or more process blocks of FIG. 5 may be performed by a fare estimating platform (e.g., fare estimating platform 230). In some implementations, one or more process blocks of FIG. 5 may be performed by another device or a group of devices separate from or including the fare estimating platform, such as a transaction device (e.g., transaction device 210), a user device (e.g., user device 220), and/or the like.

As shown in FIG. 5, process 500 may include receiving transaction data relating to a transaction event associated with a user, wherein the transaction data includes a merchant identifier of a merchant and a transaction amount (block 510). For example, the fare estimating platform (e.g., using computing resource 235, processor 320, memory 330, storage component 340, input component 350, communication interface 370, and/or the like) may receive transaction data relating to a transaction event associated with a user, as described above. In some implementations, the transaction data includes a merchant identifier of a merchant and a transaction amount.

As further shown in FIG. 5, process 500 may include processing the merchant identifier of the transaction data to determine whether the transaction event is associated with a rate-based service (block 520). For example, the fare estimating platform (e.g., using computing resource 235, processor 320, memory 330, storage component 340, and/or the like) may process the merchant identifier of the transaction data to determine whether the transaction event is associated with a rate-based service, as described above.

As further shown in FIG. 5, process 500 may include obtaining, based on determining that the transaction event is associated with the rate-based service, location data from a user device associated with the user, wherein the location data identifies a movement of the user device over a time period prior to the transaction event (block 530). For example, the fare estimating platform (e.g., using computing resource 235, processor 320, memory 330, storage component 340, input component 350, communication interface 370, and/or the like) may obtain, based on determining that the transaction event is associated with the rate-based service, location data from a user device associated with the user, as described above. In some implementations, the location data identifies a movement of the user device over a time period prior to the transaction event.

As further shown in FIG. 5, process 500 may include determining, using a model and based on the location data, a starting location associated with the rate-based service or a starting time associated with the rate-based service (block 540). For example, the fare estimating platform (e.g., using computing resource 235, processor 320, memory 330, storage component 340, and/or the like) may determine, using a model and based on the location data, a starting location associated with the rate-based service or a starting time associated with the rate-based service, as described above.

As further shown in FIG. 5, process 500 may include determining, based on the location data and a time associated with the transaction event, an ending location associated with the rate-based service or an ending time associated with the rate-based service (block 550). For example, the fare estimating platform (e.g., using computing resource 235, processor 320, memory 330, storage component 340, and/or the like) may determine, based on the location data and a time associated with the transaction event, an ending location associated with the rate-based service or an ending time associated with the rate-based service, as described above.

As further shown in FIG. 5, process 500 may include determining, based on the starting location and the ending location or based on the starting time and the ending time, a transaction estimate for the rate-based service (block 560). For example, the fare estimating platform (e.g., using computing resource 235, processor 320, memory 330, storage component 340, and/or the like) may determine, based on the starting location and the ending location or based on the starting time and the ending time, a transaction estimate for the rate-based service, as described above.

As further shown in FIG. 5, process 500 may include determining whether the transaction amount corresponds to the transaction estimate (block 570). For example, the fare estimating platform (e.g., using computing resource 235, processor 320, memory 330, storage component 340, and/or the like) may determine whether the transaction amount corresponds to the transaction estimate, as described above.

As further shown in FIG. 5, process 500 may include performing one or more actions based on determining whether the transaction amount corresponds to the transaction estimate (block 580). For example, the fare estimating platform (e.g., using computing resource 235, processor 320, memory 330, storage component 340, input component 350, output component 360, communication interface 370, and/or the like) may perform one or more actions based on determining whether the transaction amount corresponds to the transaction estimate, as described above.

Process 500 may include additional implementations, such as any single implementation or any combination of implementations described below and/or in connection with one or more other processes described elsewhere herein.

In a first implementation, the one or more actions include one or more of transmitting an alert to the user device providing information identifying that the transaction amount does not correspond to the transaction estimate, transmitting a first notification to the user device requesting that the user indicate whether the transaction amount is to be contested, transmitting a second notification to the user device requesting that the user identify a tip amount associated with the transaction amount, or flagging the transaction event as potential fraud.

In a second implementation, the fare estimating platform may determine the starting location or the starting time based on one or more of a location or a time associated with a change in the movement of the user device from a walking speed to a driving speed, a location or a time associated with a change in the movement of the user device from a pedestrian area to a roadway area, or a location or a time associated with a motion of the user device indicating a change from a standing position of the user to a sitting position of the user.

In a third implementation, alone or in combination with one or more of the first and second implementations, the transaction estimate may be further based on data relating to rates for the rate-based service. The rates may be associated with a geographical area that includes one or more locations indicated in the location data. In a fourth implementation, alone or in combination with one or more of the first through third implementations, the transaction estimate for the rate-based service may be further based on a historical transaction amount for the merchant. The historical transaction amount may be associated with a historical starting location that corresponds to the starting location and a historical ending location that corresponds to the ending location, or a historical starting time that corresponds to the starting time and a historical ending time that corresponds to the ending time.

In a fifth implementation, alone or in combination with one or more of the first through fourth implementations, the model is a first model, and the fare estimating platform, when determining the transaction estimate, may determine the transaction estimate using a second model that is to output the transaction estimate based on the starting location and the ending location or based on the starting time and the ending time.

In a sixth implementation, alone or in combination with one or more of the first through fifth implementations, the transaction amount may correspond to the transaction estimate if the transaction amount is within a threshold amount of the transaction estimate.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
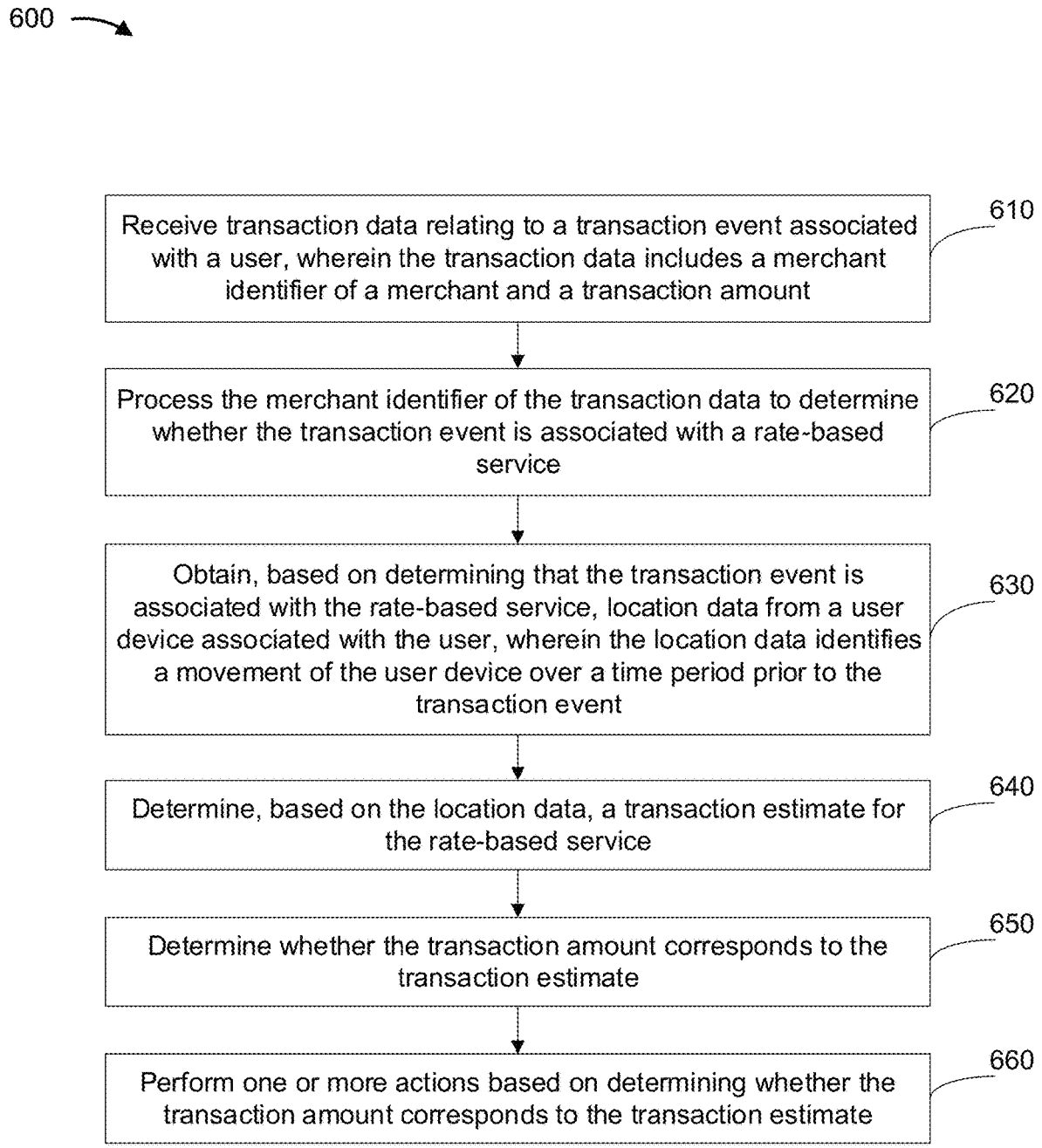

FIG. 6 is a flow chart of an example process 600 for estimating a rate-based fare. In some implementations, one or more process blocks of FIG. 6 may be performed by a fare estimating platform (e.g., fare estimating platform 230). In some implementations, one or more process blocks of FIG. 6 may be performed by another device or a group of devices separate from or including the fare estimating platform, such as a transaction device (e.g., transaction device 210), a user device (e.g., user device 220), and/or the like.

As shown in FIG. 6, process 600 may include receiving transaction data relating to a transaction event associated with a user, wherein the transaction data includes a merchant identifier of a merchant and a transaction amount (block 610). For example, the fare estimating platform (e.g., using computing resource 235, processor 320, memory 330, storage component 340, input component 350, communication interface 370, and/or the like) may receive transaction data relating to a transaction event associated with a user, as described above. In some implementations, the transaction data includes a merchant identifier of a merchant and a transaction amount.

As further shown in FIG. 6, process 600 may include processing the merchant identifier of the transaction data to determine whether the transaction event is associated with a rate-based service (block 620). For example, the fare estimating platform (e.g., using computing resource 235, processor 320, memory 330, storage component 340, and/or the like) may process the merchant identifier of the transaction data to determine whether the transaction event is associated with a rate-based service, as described above.

As further shown in FIG. 6, process 600 may include obtaining, based on determining that the transaction event is associated with the rate-based service, location data from a user device associated with the user, wherein the location data identifies a movement of the user device over a time period prior to the transaction event (block 630). For example, the fare estimating platform (e.g., using computing resource 235, processor 320, memory 330, storage component 340, input component 350, communication interface 370, and/or the like) may obtain, based on determining that the transaction event is associated with the rate-based service, location data from a user device associated with the user, as described above. In some implementations, the location data identifies a movement of the user device over a time period prior to the transaction event.

As further shown in FIG. 6, process 600 may include determining, based on the location data, a transaction estimate for the rate-based service (block 640). For example, the fare estimating platform (e.g., using computing resource 235, processor 320, memory 330, storage component 340, and/or the like) may determine, based on the location data, a transaction estimate for the rate-based service, as described above.

As further shown in FIG. 6, process 600 may include determining whether the transaction amount corresponds to the transaction estimate (block 650). For example, the fare estimating platform (e.g., using computing resource 235, processor 320, memory 330, storage component 340, and/or the like) may determine whether the transaction amount corresponds to the transaction estimate, as described above.

As further shown in FIG. 6, process 600 may include performing one or more actions based on determining whether the transaction amount corresponds to the transaction estimate (block 660). For example, the fare estimating platform (e.g., using computing resource 235, processor 320, memory 330, storage component 340, input component 350, output component 360, communication interface 370, and/or the like) may perform one or more actions based on determining whether the transaction amount corresponds to the transaction estimate, as described above.

Process 600 may include additional implementations, such as any single implementation or any combination of implementations described below and/or in connection with one or more other processes described elsewhere herein.

In a first implementation, the one or more actions include one or more of transmitting an alert to the user device providing information identifying that the transaction amount does not correspond to the transaction estimate, transmitting a first notification to the user device requesting that the user indicate whether the transaction amount is to be contested, transmitting a second notification to the user device requesting that the user identify a tip amount associated with the transaction amount, or flagging the transaction event as potential fraud.

In a second implementation, alone or in combination with the first implementation, the fare estimating platform, when determining the transaction estimate, may determine the transaction estimate based on a starting location associated with the rate-based service and an ending location associated with the rate-based service.

In a third implementation, alone or in combination with one or more of the first and second implementations, the time period may be greater than, or equal to, an estimated duration for the rate-based service. In a fourth implementation, alone or in combination with one or more of the first through third implementations, the merchant may be a taxi service.

In a fifth implementation, alone or in combination with one or more of the first through fourth implementations, the fare estimating platform, when processing the merchant identifier, may process the merchant identifier using a machine learning model that is to output an indication of whether the merchant is associated with the rate-based service based on the merchant identifier.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   obtaining, by a device, location data identifying a movement of a user device over a time period associated with a use of a rate-based service;
   determining, by the device and using at least one of motion sensor data from a motion sensor of the user device or location sensor data from a location sensor of the user device, a starting location or a starting time based on one or more of:
      a location or a time associated with a change in the movement of the user device from a walking speed to a driving speed,
      a location or a time associated with a change in the movement of the user device from a pedestrian area to a roadway area, or
      a location or a time associated with a motion of the user device indicating a change from a standing position of a user of the user device to a sitting position of the user;
   determining, by the device and based on the location data, at least one of:
      a distance based on the starting location and an ending location associated with the rate-based service, or
      a duration based on the starting time and an ending time associated with the rate-based service;
   determining, by the device and based on the at least one of the distance or the duration, a transaction estimate for the rate-based service; and
   performing, by the device, one or more actions based on the transaction estimate.

2. The method of claim 1, wherein determining the transaction estimate comprises:
   identifying historical data associated with prior uses of the rate-based service, and
   determining the transaction estimate based on the historical data.

3. The method of claim 2, wherein the historical data comprises, for each of the prior uses, a historical transaction amount and at least one of:
   a historical distance traveled for each of the prior uses,
   a historical duration of each of the prior uses.

4. The method of claim 1, wherein performing the one or more actions comprises:
   transmitting a notification to the user device,
      the notification providing information indicating that a transaction amount associated with the use of the rate-based service does not correspond to the transaction estimate.

5. The method of claim 1, wherein performing the one or more actions comprises:
   transmitting a notification to the user device,
      the notification requesting that the user indicate whether a transaction amount associated with the use of the rate-based service is to be contested.

6. The method of claim 1, wherein performing the one or more actions comprises:
   flagging transaction data associated with the use of the rate-based service as potential fraud based on the transaction estimate.

7. The method of claim 1, wherein obtaining the location data comprises:
   obtaining the location data based on identifying a transaction associated with the rate-based service.

8. A device, comprising:
   one or more memories; and
   one or more processors, coupled to the one or more memories, configured to:
      obtain location data identifying a movement of a user device over a time period associated with a use of a rate-based service;
      determine, using at least one of motion sensor data from a motion sensor of the user device or location sensor data from a location sensor of the user device, a starting location or a starting time based on one or more of:
         a location or a time associated with a change in the movement of the user device from a walking speed to a driving speed,
         a location or a time associated with a change in the movement of the user device from a pedestrian area to a roadway area, or
         a location or a time associated with a motion of the user device indicating a change from a standing position of a user of the user device to a sitting position of the user;
      determine, based on the location data, at least one of:
         a distance based on the starting location and an ending location associated with the rate-based service, or
         a duration based on the starting time and an ending time associated with the rate-based service;
      determine, based on the at least one of the distance or the duration, a transaction estimate for the rate-based service; and
      perform one or more actions based on the transaction estimate.

9. The device of claim 8, wherein the one or more processors, to determine the transaction estimate, are configured to:
   identify historical data associated with prior uses of the rate-based service, and
   determine the transaction estimate based on the historical data.

10. The device of claim 9, wherein the historical data comprises, for each of the prior uses, a historical transaction amount and at least one of:
    a historical distance traveled for each of the prior uses,
    a historical duration of each of the prior uses.

11. The device of claim 8, wherein the one or more processors, to perform the one or more actions, are configured to:
    transmit a notification to the user device,
       the notification providing information indicating that a transaction amount associated with the use of the rate-based service does not correspond to the transaction estimate.

12. The device of claim 8, wherein the one or more processors, to perform the one or more actions, are configured to:
    transmit a notification to the user device, the notification requesting that the user indicate whether a transaction amount associated with the use of the rate-based service is to be contested.

13. The device of claim 8, wherein the one or more processors, to perform the one or more actions, are configured to:
flag transaction data associated with the use of the rate-based service as potential fraud based on the transaction estimate.

14. The device of claim 8, wherein the one or more processors, to obtain the location data, are configured to:
obtain the location data based on identifying a transaction associated with the rate-based service.

15. A non-transitory computer-readable medium storing a set of instructions, the set of instructions comprising:
one or more instructions that, when executed by one or more processors of a device, cause the device to:
obtain location data identifying a movement of a user device over a time period associated with a use of a rate-based service;
determine, using at least one of motion sensor data from a motion sensor of the user device or location sensor data from a location sensor of the user device, a starting location or a starting time based on one or more of:
a location or a time associated with a change in the movement of the user device from a walking speed to a driving speed,
a location or a time associated with a change in the movement of the user device from a pedestrian area to a roadway area, or
a location or a time associated with a motion of the user device indicating a change from a standing position of a user of the user device to a sitting position of the user;
determine, based on the location data, at least one of:
a distance based on the starting location and an ending location associated with the rate-based service, or
a duration based on the starting time and an ending time associated with the rate-based service;
determine, based on the at least one of the distance or the duration, a transaction estimate for the rate-based service; and
perform one or more actions based on the transaction estimate.

16. The non-transitory computer-readable medium of claim 15, wherein the one or more instructions, that cause the device to determine the transaction estimate, cause the device to:
identify historical data associated with prior uses of the rate-based service, and
determine the transaction estimate based on the historical data.

17. The non-transitory computer-readable medium of claim 16, wherein the historical data comprises, for each of the prior uses, a historical transaction amount and at least one of:
a historical distance traveled for each of the prior uses,
a historical duration of each of the prior uses.

18. The non-transitory computer-readable medium of claim 15, wherein the one or more instructions, that cause the device to perform the one or more actions, cause the device to:
transmit a notification to the user device,
the notification providing information indicating that a transaction amount associated with the use of the rate-based service does not correspond to the transaction estimate.

19. The non-transitory computer-readable medium of claim 15, wherein the one or more instructions, that cause the device to perform the one or more actions, cause the device to:
transmit a notification to the user device,
the notification requesting that the user indicate whether a transaction amount associated with the use of the rate-based service is to be contested.

20. The non-transitory computer-readable medium of claim 15, wherein the one or more instructions, that cause the device to perform the one or more actions, cause the device to:
flag transaction data associated with the use of the rate-based service as potential fraud based on the transaction estimate.

* * * * *